HANNAH J. GALE.
Culinary Steamer.
No. 134,046.
Patented Dec. 17, 1872.
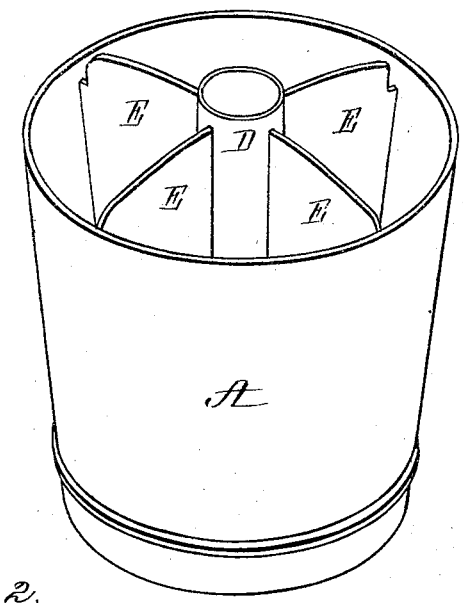
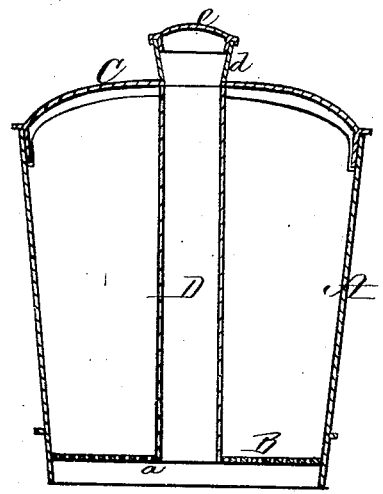
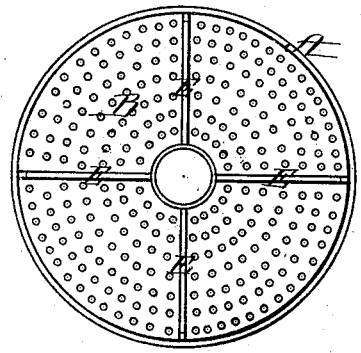
Witnesses
N. W. Stearns
W. J. Cambridge
Inventor,
Mrs. H. J. Gale

UNITED STATES PATENT OFFICE.

HANNAH J. GALE, OF HAVERHILL, MASSACHUSETTS.

IMPROVEMENT IN CULINARY STEAMERS.

Specification forming part of Letters Patent No. 134,046, dated December 17, 1872.

*To all whom it may concern:*

Be it known that I, HANNAH J. GALE, of Haverhill, in the county of Essex and State of Massachusetts, have invented certain Improvements in Boilers or Steamers for Culinary Purposes; and I hereby declare the following to be a full, clear, and exact description thereof, reference being had to the accompanying drawing, making a part of this specification, in which—

Figure 1 is a perspective view of my improved boiler, the cover being removed; Fig. 2 is a central vertical section with the cover in place; and Fig. 3 is a plan of the same, the cover being removed.

My invention has for its object to provide a culinary boiler or steamer whereby the vessel containing the water can be replenished without removing the vessel containing the vegetables. My invention consists in introducing in the center of the vegetable-vessel a vertical pipe or cylinder opening through its bottom into the water-vessel beneath, and having an opening directly over it in the cover of the said vegetable-vessel.

In order that those skilled in the art may make and use my invention, I shall proceed to describe the manner in which I have carried it out.

In the said drawing, A is a vegetable-receptacle having a perforated bottom, B, and top or cover C. The perforated bottom B has at its center an opening, $a$. Rising from and fastened to the edges of this opening is a tube, D, which extends a little above the upper edge of the vessel A. The top C is made with an opening in it to correspond to the upper end of the tube D, and from this opening rises a thimble, $d$, which has its lower edge fastened to the said opening and its top covered by a cap, $e$. E E are partitions which serve as braces for the tube D, and also form compartments by which different kinds of vegetables can be steamed at the same time without intermixture of flavors.

When it is desired to introduce water into the water-vessel, on which the vessel A rests, it is only necessary to remove the cap $e$ and pour the water in through the thimble $d$ and tube D.

Having thus described my invention, what I claim as new, and desire to secure by Letters Patent, is—

The partitioned vegetable-receptacle A having the tube D in combination with the cover C having the thimble $d$ $e$, whereby I am enabled to fill the water-vessel without removing the vegetable-receptacle.

MRS. H. J. GALE.

Witnesses:
N. W. STEARNS,
W. J. CAMBRIDGE.